United States Patent [19]

Hartley

[11] 3,994,314
[45] Nov. 30, 1976

[54] SERVO REGULATOR
[76] Inventor: Ezra D. Hartley, 2700 Jalmia Drive, Los Angeles, Calif. 90046
[22] Filed: May 8, 1975
[21] Appl. No.: 575,801

[52] U.S. Cl. .................. 137/596.17; 137/596.1; 137/613; 251/DIG. 2; 251/298
[51] Int. Cl.² ........................................ G05D 16/00
[58] Field of Search ............... 137/501, 596, 596.1, 137/596.17, 625.2, 625.21, 625.42, 625.44, 625.65, 613, 614.19; 251/DIG. 2, 298

[56] References Cited
UNITED STATES PATENTS

| | | | |
|---|---|---|---|
| 2,784,740 | 3/1957 | Stageberg | 251/DIG. 2 |
| 3,007,494 | 11/1961 | Herzl | 137/625.65 |
| 3,211,182 | 10/1965 | Gyurik et al. | 137/625.61 |
| 3,334,656 | 8/1967 | Boyle | 137/596.1 |
| 3,371,685 | 3/1968 | Tilney | 137/613 X |
| 3,404,704 | 10/1968 | Adams | 137/625.22 |
| 3,455,210 | 7/1969 | Allen | 137/596.13 X |
| 3,534,774 | 10/1970 | Tennis | 137/596.1 X |
| 3,744,517 | 7/1973 | Budzich | 137/596.1 X |
| 3,882,896 | 5/1975 | Budzich | 137/596.1 |

Primary Examiner—Alan Cohan
Assistant Examiner—Gerald A. Michalsky
Attorney, Agent, or Firm—Gordon L. Peterson

[57] ABSTRACT

A pressure regulator comprising a regulated pressure chamber and first and second conduits leading to the regulated pressure chamber. The first and second conduits are adapted to communicate with fluid at first and second pressures, respectively. A first valve controls fluid flow between the first conduit and the regulated pressure chamber, and a second valve controls fluid flow between the second conduit and the regulated pressure chamber. The valves are controlled so that the pressure in the regulated pressure chamber can also be controlled. The first valve is subject to failure if the pressure drop across the first valve exceeds a predetermined magnitude, and a pre-regulator controls the pressure in the first conduit to maintain the pressure drop across the first valve no greater than about said first magnitude.

13 Claims, 4 Drawing Figures

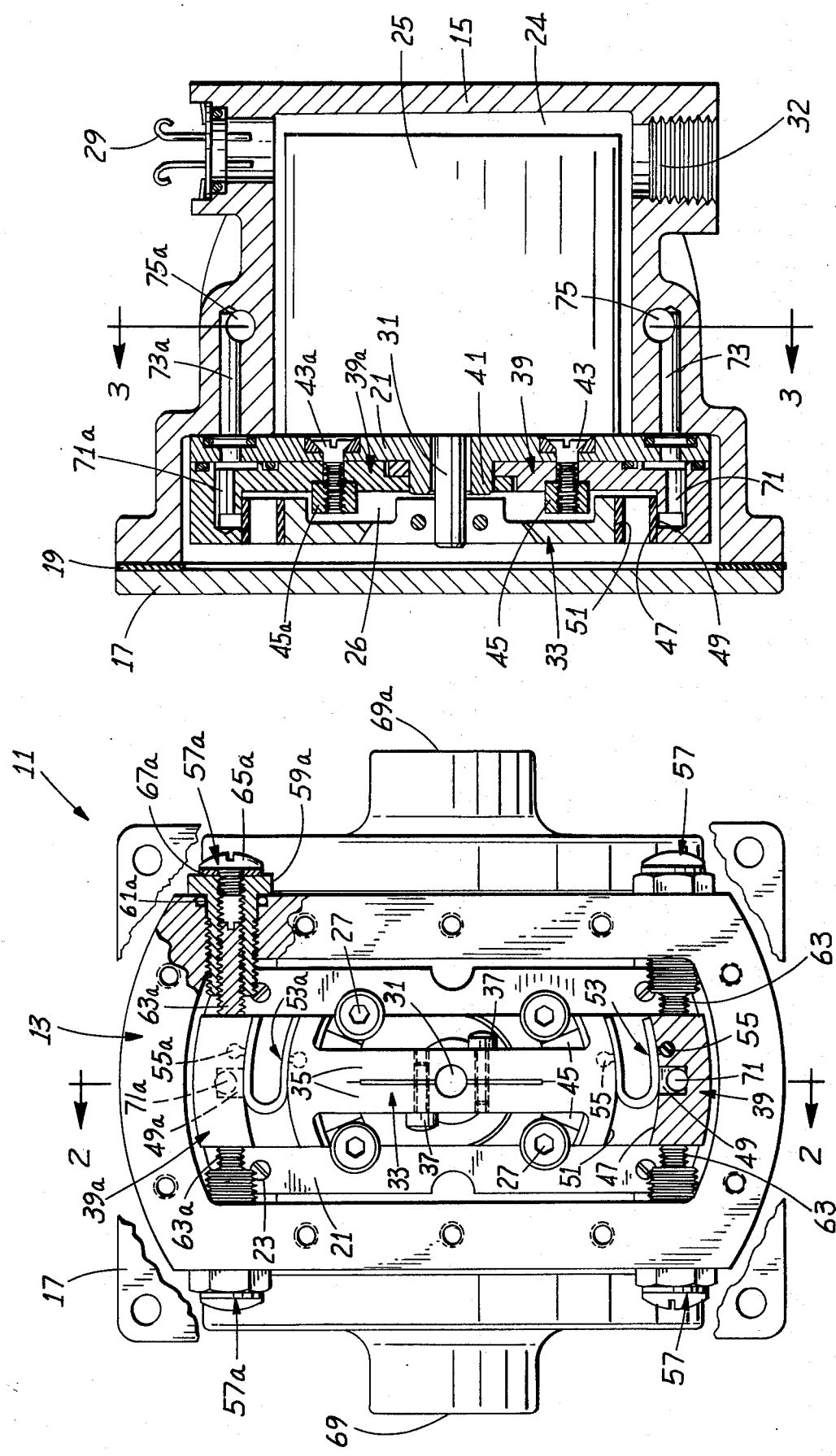

SERVO REGULATOR

BACKGROUND OF THE INVENTION

An air pressure regulator provides a fluid pressure output which varies with an input signal. Pressure regulators have many usages which require that the regulated pressure be very accurately controlled. One example is in the testing of pneumatic instruments such as an air speed indicator, an altimeter, and a rate of descent meter for an aircraft. It is also necessary to test the systems in which these instruments are used. The test must accurately simulate the air pressure these instruments encounter during actual inflight conditions, and this requires that the air pressure regulator provide air pressure above and below ambient pressure.

One prior art system for pressure regulators utilizes two regulators, one for pressures above ambient and one for pressures below ambient. Each regulator uses a flexible, resilient, valve strip folded between a swing arm and a port. By pivoting the swing arm, the valve strip is moved to progressively close or open the port. The differential pressure across the port tends to seat the valve strip against the surface surrounding the port.

The use of a folded valve strip is most effective in a pressure regulator. Unfortunately, the prior art system described above requires two of the regulators, and this substantially increases the cost and complexity of the system.

SUMMARY OF THE INVENTION

The present invention provides a single regulator using folded valve strips which can provide both positive pressure and vacuum pressure. This desirable result is based in part on the recognition that a valve strip can be used even though the differential pressure acting against it, i.e. the pressure drop across the port, is in a direction tending to unseat the valve strip. As indicated above, in the prior art regulators, the valve strips were used so that the differential pressure would tend to seat the valve strip against the surface around the port.

This concept can be embodied in a pressure regulator which includes first and second surface portions and first and second passages terminating respectively in ports at the first and second surface portions. A movable actuator is mounted between the ports, and first and second folded valve strips are between the actuator and the two ports, respectively. The two ports are in communication with fluid at different pressures such as a positive pressure and a vacuum pressure. A regulated pressure chamber is in communication with the ports so that the amount that the ports are open controls the pressure in the regulated pressure chamber.

With this arrangement, the valve strip associated with the vacuum port is held against the surface surrounding the port by the differential fluid pressure. However, the valve strip associated with the pressure port is urged away from the pressure port. If the differential pressuree exceeds a given magnitude, the valve strip will be blown off of the port and this will result, in effect, in a failure of the valve.

To prevent the valve strip associated with the pressure port from being blown off of the port, a pre-regulator is provided for limiting the pressure drop across the pressure port to a safe magnitude. With this arrangement, a single actuator can control both of the valve strips.

A second pre-regulator may be used to control the pressure drop across the vacuum port. While this is not necessary to prevent the valve strip from being blown off of the vacuum port, it is desirable in order to provide the same response for the pressure and vacuum ports.

Although the actuator for moving the valve strips can be of different configurations and move along different paths, the actuator can advantageously take the form of a pivotally mounted swing arm. Another advantage of controlling both valve strips with a single swing arm is that the valve strips may be selected and arranged to apply substantially equal and opposite couples to the swing arm. With the forces on the swing arm balanced in this fashion, the swing arm can be made extremely sensitive.

The pressure regulator must have a null position in which it maintains the pressure within the regulated pressure chamber at an established level. It is important that the null position be accurately set. To accomplish this, the present invention provides a port arm having one of the ports thereon. The port arm is mounted for pivotal movement and can be fixed in any one of a plurality of positions about its pivot axis without moving the swing arm. The port arm can be accurately positioned by a sealed system of adjusting screws.

In a preferred embodiment, the regulator includes a housing in which substantially all of the components of the regulator are housed. The swing arm is driven by a torque motor or other device which can accurately respond to an input signal such as an electrical signal which varies to control the pressure in the regulated pressure chamber. The valve strip should be attached to the actuator and the port arm. Although this can be accomplished adhesively or with other means, it is preferred to use cooperating interlocking projections and recesses. This facilitates assembly and provides for automatic positioning of the valve strip relative to the port and the actuator.

The invention can best be understood by reference to the following description taken in connection with the accompanying illustrative drawings.

BRIEF DESCRIPTION OF THE DRAWINGS

FIG. 1 is a plan view partially in section, with the cover broken away, of a pressure regulator constructed in accordance with the teachings of this invention.

FIG. 2 is a sectional view taken generally along line 2—2 of FIG. 1.

DESCRIPTION OF THE PREFERRED EMBODIMENT

Figure 3:
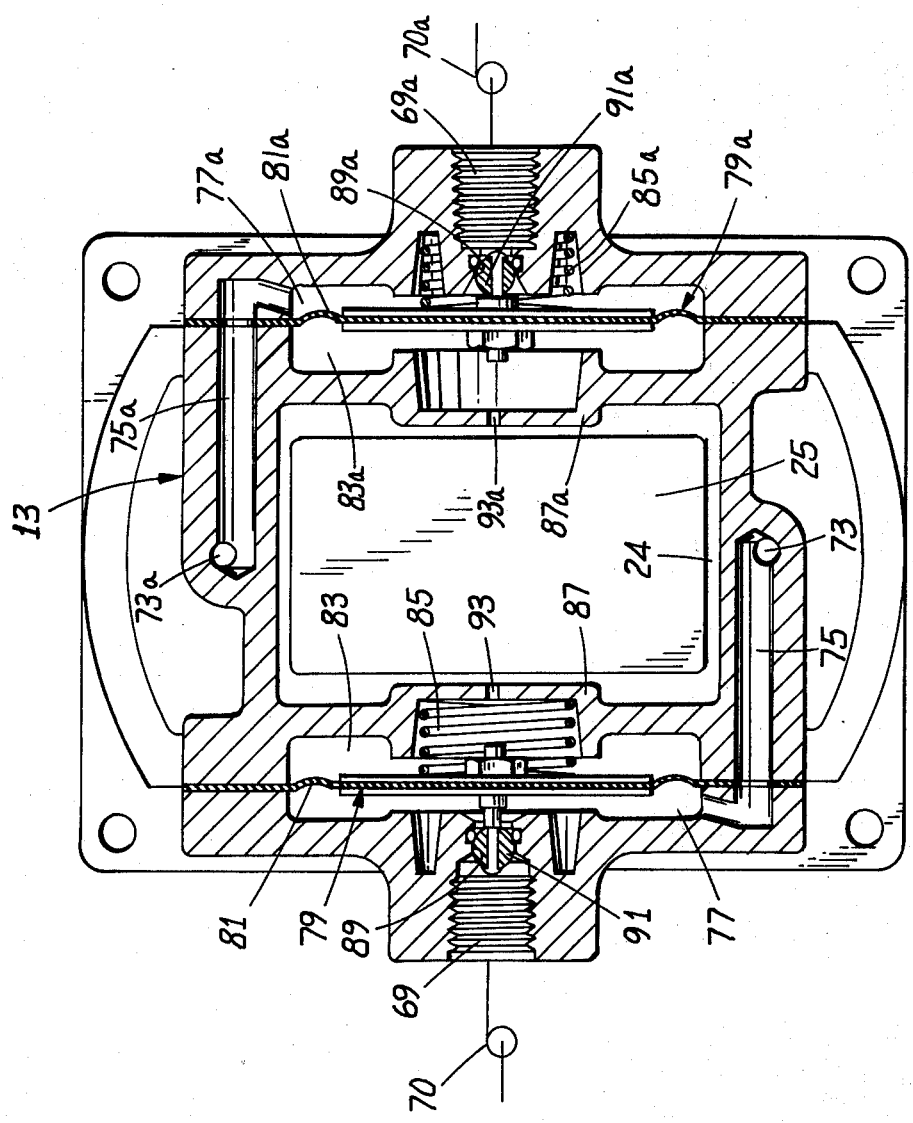
FIG. 3 is a sectional view taken generally along line 3—3 of FIG. 2

FIGS. 1–3 show a pressure regulator 11 which includes a supporting structure or housing 13. The housing 13, which may be of various different configurations, includes a body section 15 and a cover 17 (FIG. 2) suitably attached thereto as by screws (not shown). A seal 19 seals the cover-body section interface.

A mounting plate 21 (FIGS. 1 and 2) is attached to the body section 15 in any suitable manner such as by screws 23 (FIG. 1) to divide the interior of the housing into two compartments 24 and 26. A torque motor 25 is located in the compartment 24 and is mounted on the mounting plate 21 by a plurality of screws 27. The torque motor 15 is coupled to a terminal 29 (FIG. 2) which is adapted for connection to a controller (not shown) for providing an electrical intput signal to the torque motor. The torque motor has an output shaft 31 which projects through an opening in the mounting plate 21 into the compartment 26. The torque motor rotates or pivots the output shaft 31 about its longitudinal axis in accordance with the input signal received via the terminal 29. The compartments 24 and 26 form a regulated pressure chamber. The compartment 26 has an outlet port 32.

An actuator which in the embodiment illustrated is in the form of a swing arm 33 is driven by the shaft 31. Although various constructions can be utilized, in the embodiment illustrated, the swing arm 33 includes integral jaws 35 separated by a slot and clamped tightly against the shaft 31 by screws 37 to mount the swing arm on the shaft. The longitudinal axis of the shaft 31 defines a pivot axis for the swing arm 33, and the swing arm is symmetrical about that pivot axis.

A pair of substantially identical port arms 39 and 39a are pivotally mounted on a central boss 41 of the mounting plate 21. The port arm 39 is prevented from falling off of the boss 41 by a screw 43 and an arcuate segment 45 which rides in an arcuate groove in the outer surface of the port arm 39. As best shown in FIG. 2, the screw 43 attaches the segement 45 to the mounting plate 21. The port arm 39a is similarly attached to the mounting plate 21, and corresponding parts are designated by corresponding reference numerals followed by the letter a.

The port arm 39 has a surface or surface portion 47 with a port 49 terminating in that surface. The swing arm 33 has a peripheral surface 51 which confronts the surface 47. In the embodiment illustrated, the surfaces 47 and 51 form portions of concentric cylinders having their centers coincident with the longitudinal axis of the shaft 31. The surfaces 47a and 51a at the opposite end of the swing arm 33 are similarly configured and arranged.

A flexible resilient valve strip 53 is folded into a generally U-shaped configuration with the legs of the U attached, respectively, to the surfaces 47 and 51. A valve strip 53a which is identical to the valve strip 53 is similarly mounted between the swing arm 33 and the port arm 39a and corresponding portions are designated by corresponding reference numbers followed by the letter a.

Figure 4:
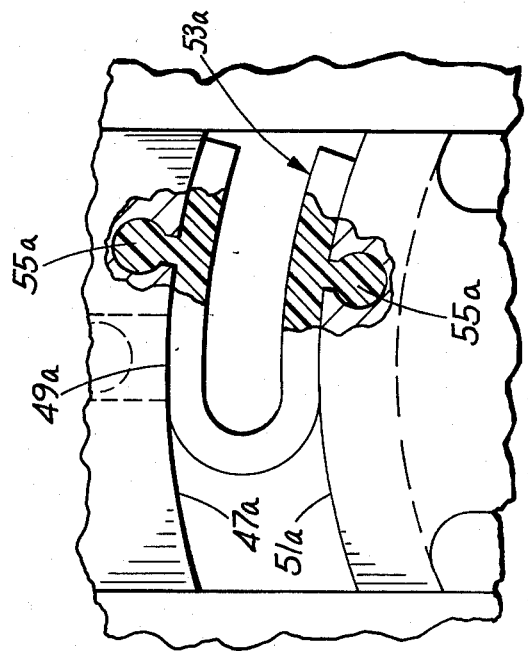
FIG. 4 is an enlarged fragmentary sectional view illstrating a preferred manner of attaching one of the valve strips to the torque arm and the port arm.

Although the valve strip 53a may be attached to the surfaces 47a and 51a in different ways, in the embodiment illustrated, this attachment is obtained by projections 55a (FIG. 4) on the legs of the valve strip 53a and corresponding recesses in the surfaces 47a and 51a. The use of the projections 55a and the corresponding recesses facilitates assembly and provides means for automatically aligning and positioning the valve strip 53a relative to the surfaces 47a and 51a and the port 49a.

Valve strips such as the valve strip 53 are known per se. The valve strip 53 may be constructed of any resilient material. For example, polyurethane rubber and silicone rubber may be used.

As shown in FIG. 1, both of the valve strips 53 and 53a open to the right. Thus, if the swing arm 33 rotates clockwise as viewed in FIG. 1, the port 49a is progressively uncovered, and the port 49 is progressively covered. Conversely, if the swing arm 33 rotates in the counterclockwise direction, the port 49a is progressively covered, and the port 49 is progressively uncovered. The ports 49 and 49a are preferably of identical size and shape so that they are opened and closed at the same rate.

The angular position of the port arm 49 about the boss 41 can be adjusted by identical adjusting screw devices 57. Similarly, the angular position of the port arm 39a about the boss 41 can be adjusted by identical adjusting screw devices 57a which are identical to the devices 57. As shown in FIG. 1, each of the adjusting screw devices 57a includes an internally and externally threaded bushing 59a mounted on the housing 13 and sealed to the housing by a seal 61a. An adjusting screw 63a is screwed into the bushing 59a and has an end face which abuts one side of the port arm 39a. The central passage through the bushing 59a is sealed by a screw 65a and a seal 67a. Thus, the port arm 39a can be positioned by backing off on one of the screws 63a while correspondingly advancing the other of the screws 63a. Similarly, the port arm 39 can be positioned by backing off on one of the screws 63 while correspondingly advancing the other of the screws 63. The screws 65a and the seals 67a prevent leakage into or out of the housing 13 through the adjusting screw devices.

The housing 13 has a port 69 (FIG. 3) which is adapted for connection to fluid under a positive pressure, i.e. above ambient pressure such as the discharge of a pump 70. A conduit or passage interconnects the port 49 to the port 69. This conduit includes a passage 71 in the port arm 39 (FIGS. 1 and 2), a passage section 73 (FIGS. 2 and 3) in the housing 13, a passage section 75 in the housing 13, and a chamber 77 (FIG. 3).

Similarly, the housing 13 has a port 69a (FIG. 3) which is adapted for connection to a source of vacuum pressure, i.e. pressure less than atmospheric, such as the intake of a pump 70a. A passage or conduit extends from the port 49a to the port 69a and includes a passage 71a, a passage section 73a, a passage section 75a, and a chamber 77a.

A pre-regulator 79 is provided to control the pressure drop across the port 49. Although the pre-regulator 79 could be of various different kinds, in the embodiment illustrated, it includes a control member in the form of a diaphragm 81 suitably mounted in the housing 13 and dividing a compartment of the housing into a chamber 83 and the chamber 77. A coil compression spring 85 acts between the diaphragm 81 and a wall 87 of the housing to urge the diaphragm to the left as viewed in FIG. 3. A valve seat 89 is formed within the port 69. A valve element 91 is attached to the diaphragm 81 and is movable to engage the valve seat 89 to block communication between the ports 49 and 69.

The position of the valve element 89 is controlled by the diaphragm 81. The left side of the diaphragm 81 (as viewed in FIG. 3), i.e. the chamber 77, is in communication with the upstream side of the port 49, i.e. with the passage 71. The righthand face of the diaphragm 81 is in communication with the compartments 24 and 26 which define the regulated air chamber by way of an opening 93 in the wall 87. Thus, the right face of the diaphragm 81 communicates with the regulated pressure chamber or downstream side of the port 49. In this manner, the diaphragm 81 senses the pressure drop across the port 49 and hence the differential pressure acting on the valve strip 53.

The spring 85 tends to hold the valve element 91 open. Thus, the strength of the spring 85 determines the allowable differential pressure which can act on the valve strip 53. Obviously, the allowable differential pressure can be selected for specific applications by those versed in the art; however, in the embodiment illustrated, the allowable differential pressure is 1 psi.

Preferably, a pre-regulator 79a is associated with the port 49a and the valve strip 53a to control the pressure drop across the port 49a. The pre-regulator 79a is substantially identical to the pre-regulator 79 except as expressly noted herein, and corresponding portions are designated by corresponding reference numerals followed by the letter a. One difference is that the spring 85a acts between the outer wall of the housing 13 and the diaphragm 81a. A second difference is that the valve element 91a seats against the valve seat 89 in response to moving outwardly of the housing 13. These differences adapt the pre-regulator 79a to block off the passage when the regulated pressure exceeds by a predetermined magnitude the pressure in the chamber 77a. Preferably, the pre-regulator 79a closes the port 69a in response to a differential pressure across the port 49a which is identical to the differential pressure at which the pre-regulator 79 closes the port 69, i.e. 1 psi in the embodiment illustrated.

Before using the pressure regulator 11, it must be adjusted to establish a null position. This is accomplished by utilizing the adjusting screw devices 57 and 57a to pivot the port arms 39 and 39a to adjust the amount that the ports 49 and 49a are open with the swing arm 33 in a neutral or intermediate position. Although the manner of obtaining the null position can be varied, one preferred way is to have an extremely small flow into the regulated pressure chamber through the port 49 and an identically small flow out of the port 49a. By using accurate flow meters and adjusting the angular positions of the port arms 39 and 39a, this can be accomplished.

Assuming that the port 69 is coupled to the discharge side of the pump 70 and the port 69a is coupled to the intake of a pump 70a, the pressure regulator is ready for use. The torque motor 25 receives an input signal which corresponds to a particular fluid pressure which may be greater or less then ambient. The torque motor 25 positions the swing arm 33 in response to this input signal, and the swing arm in turn opens one of the ports 49 and 49a and correspondingly closes the other of these ports. This causes fluid under pressure to be supplied through the port 49 and/or fluid to be vented from the regulated pressure chamber out through the port 49a to obtain the desired pressure within the regulated pressure chamber. When the desired pressure is reached, it is maintained in response to an appropriate input signal by returning the swing arm 33 to null. The fluid at regulated pressure is supplied through the outlet port 32. During this period of operation, the pre-regulators 79 and 79a limit the differential pressure acting on the valve strips 53 and 53a to less than a predetermined maximum. If the pressure drop exceeds this maximum, the valve element 89 or 89a, as the case may be, is closed until the pressure drop is reduced to within allowable limits. Of course, the predetermined maximum pressure differential is less than the differential pressure necessary to unseat the valve strip 53.

Many variations will be apparent to those skilled in the art. For example, the swing arm 33 can be moved and controlled by means other than a torque motor. The pressure regulator 11 is adapted for use with fluid at two different pressures, and it is not limited solely to use with fluid at positive pressure and fluid at vacuum pressure. Although the pressure regulator is adapted for use with air, it can be used with other fluids.

Although an exemplary embodiment of this invention has been shown and described, many changes, modifications and substitutions may be made by those with ordinary skill in the art without necessarily departing from the spirit and scope of this invention.

I claim:
1. A pressure regulating system comprising:
   means for defining a regulated pressure chamber;
   means for supplying fluid at a positive pressure which is greater than atmospheric;
   means for providing a fluid at vacuum pressure which is less than atmospheric pressure;
   first and second conduits leading to said regulated pressure chamber, said first and second conduits communicating with fluid at said positive and vacuum pressures, respectively;
   first valve means for controlling fluid flow between said first conduit and said regulated pressure chamber;
   second valve means for controlling fluid flow between said second conduit and said regulated pressure chamber;
   means for controlling said first and second valves to thereby control pressure in the regulated pressure chamber;
   said first valve means being subject to failure if the pressure drop across the first valve means in at least one direction exceeds a first magnitude; and
   means for controlling the pressure in said first conduit on the side of said first valve means remote from said regulated pressure chamber to maintain the pressure drop across said first valve means no greater than about said first magnitude.

2. A pressure regulating system as defined in claim 1 wherein said first valve means includes means defining a port and a valve strip which is movable by said controlling means to cover and uncover said port to at least assist in controlling fluid flow between said first conduit and said regulated pressure chamber, the fluid at positive pressure tending to move said valve strip off of said port at pressures greater than about said first magnitude.

3. A pressure regulator comprising:
   a supporting structure;
   means on the supporting structure defining first and second surface portions;
   first means on the supporting structure defining a first passage having a first port adapted to communicate with fluid at greater than ambient pressure and a second port terminating at said first surface portion;
   means on the supporting structure defining a second passage having a first port adapted to communicate with fluid at less than ambient pressure and a second port terminating in said second surface portion;
   a swing arm;
   means for mounting the swing arm on the supporting structure for pivotal movement;

a torque motor on the supporting structure for driving the swing arm;

first and second resilient valve strips, said first valve strip being between a first region of the swing arm and said first surface portion and said second valve strip being between a second region of the swing arm and said second surface portion, said valve strips being movable by pivotal movement of the swing arm to progressively cover and uncover said second ports with pivotal movement of the swing arm in one direction progressively covering one of said second ports and progressively uncovering the other of said second ports;

means defining a regulated pressure chamber in communication with said second ports whereby the amount that said second ports are open controls the pressure in said regulated pressure chamber; and first regulator means for limiting the pressure drop across said second port of said first passage to a first magnitude.

4. A pressure regulator as defined in claim 3 including second regulator means for limiting the pressure drop across the second port of the second passage to about said first magnitude, said first and second regions of the swing arm being generally opposite each other, said valve strips exerting approximately equal and opposite resilient forces on said swing arm.

5. A pressure regulator as defined in claim 3 including an integral projection on said first valve strip and a corresponding recess in said first surface portion, said projection being received in said recess to attach the first valve strip to the first surface portion.

6. A pressure regulator as defined in claim 3 wherein said supporting structure includes a housing and a mounting plate in said housing dividing the housing into first and second compartments, said torque motor being in the first compartment and the swing arm, valve strips and second ports being in the second compartment, said first means including a port arm containing said second port of said first passage, means for mounting the port arm on the mounting plate for pivotal movement about a pivot axis, and means for fixing the port arm in any of a plurality of positions about said pivot axis.

7. A pressure regulator as defined in claim 3 wherein said supporting structure includes a housing, said swing arm, said valve strips, said first and second surface portions and at least a portion of said regulated pressure chamber being within said housing, said first regulator means including a valve element to control fluid flow through the first passage and a control member to control said valve element, said housing having a partition between the regulated pressure chamber and one side of the control member, said partition having an opening therein to provide communication between the regulated pressure chamber and said one side of the control member, the other side of said control member communicating with said first passage between the valve element and the second port of the first passage.

8. A pressure regulator comprising:
means defining a first surface;
an actuator having an actuator surface;
means for mounting the actuator for movement;
a valve strip, said valve strip being between said actuator surface and said first surface;

first means defining a first passage adapted to communicate with fluid at a first pressure and having a port terminating at one of said surfaces;

resilient means for holding the valve strip against said one surface;

said valve strip being movable by movement of the actuator to cover and uncover said port;

means defining a regulated pressure chamber communicable with said port whereby the amount that said port is open can influence the pressure in said regulated pressure chamber;

said valve strip being movable away from the port by fluid pressure when the pressure drop across said port in at lease one direction exceeds about a first magnitude; and regulator means for limiting the pressure drop across said port in said one direction to about said first magnitude.

9. A pressure regulator comprising:
means defining first and second surface portions;
first means defining a first passage having a first port adapted to communicate with fluid at a first pressure and a second port terminating at said first surface portion;

means defining a second passage having a first port adapted to communicate with fluid at a second pressure and a second port terminating in said second surface portion;

an actuator;
means for mounting the actuator for movement;
first and second valve strips, said first valve strip being between a first region of the actuator and said first surface portion and said second valve strip being between a second region of the actuator and said second surface portion, said valve strips being movable by movement of the actuator to cover and uncover said second ports;

means defining a regulated pressure chamber communicable with said second ports whereby the amount that said second ports are open controls the pressure in said regulated pressure chamber;

first regulator means for limiting the pressure drop across one of said second ports to a first magnitude; and said first means including a movable section and said movable section including said first surface portion and said second port of said first passage, said pressure regulator including means for mounting said movable section for movement relative to said actuator and means for fixing said movable section in any of a plurality of different locations relative to said actuator.

10. A pressure regulator as defined in claim 9 including means for attaching said first valve strip to at least one of said actuator and said first surface portion, said attaching means including a cooperating projection and recess.

11. A pressure regulator comprising:
means defining first and second surface portions;
first means defining a first passage having a first port adapted to communicate with fluid at a first pressure and a second port terminating at said first surface portion;

means defining a second passage having a first port adapted to communicate with fluid at a second pressure and a second port terminating in said second surface portion;

an actuator;

means for mounting the actuator for movement;

first and second valve strips, said first valve strip being between a first region of the actuator and said first surface portion and said second valve strip being between a second region of the actuator and said second surface portion, said valve strips being movable by movement of the actuator to cover and uncover said second ports;

means defining a regulated pressure chamber communicable with said second ports whereby the amount that said second ports are open controls the pressure in said regulated pressure chamber;

first regulator means for limiting the pressure drop across one of said second ports to a first magnitude; and said first valve strip being seated against said first surface portion and said one second port terminating at said first surface portion, said first valve strip being unseated from said first surface portion in response to the pressure differential thereacross in a first direction reaching a second magnitude, said second magnitude being greater than said first magnitude.

12. A pressure regulator as defined in claim 11 including second regulator means for limiting the pressure drop across the other of said second ports to about said first magnitude.

13. A pressure regulator as defined in claim 11 wherein said mounting means mounts the actuator for pivotal movement, each of said valve strips is resilient and applies a resilient force to said actuator, and said valve strips being selected and arranged to apply substantially equal and opposite couples to said actuator.

* * * * *